US009444718B2

(12) United States Patent
Khakpour et al.

(10) Patent No.: US 9,444,718 B2
(45) Date of Patent: Sep. 13, 2016

(54) DISTRIBUTED PLATFORM TEST NETWORK

(71) Applicant: Verizon Digital Media Services Inc., Playa Vista, CA (US)

(72) Inventors: Amir Khakpour, Santa Monica, CA (US); Robert J. Peters, Santa Monica, CA (US); Derek Shiell, Los Angeles, CA (US); Hossein Lotfi, Los Angeles, CA (US); Thomren Boyd, Los Angeles, CA (US)

(73) Assignee: Verizon Digital Media Services Inc., Playa Vista, CA (US)

( * ) Notice: Subject to any disclaimer, the term of this patent is extended or adjusted under 35 U.S.C. 154(b) by 169 days.

(21) Appl. No.: 14/444,901

(22) Filed: Jul. 28, 2014

(65) Prior Publication Data

US 2016/0028598 A1    Jan. 28, 2016

(51) Int. Cl.
*G06F 15/16* (2006.01)
*H04L 12/26* (2006.01)

(52) U.S. Cl.
CPC .................................. *H04L 43/50* (2013.01)

(58) Field of Classification Search
USPC ....... 709/203, 204, 206, 217, 219, 223, 224, 709/226, 228, 232, 238; 370/252, 253; 718/100
See application file for complete search history.

(56) References Cited

U.S. PATENT DOCUMENTS

| 2007/0118668 | A1* | 5/2007 | McCarthy | H04L 29/12066 709/238 |
|---|---|---|---|---|
| 2010/0150018 | A1* | 6/2010 | Beattie, Jr. | H04L 43/50 370/253 |
| 2010/0299439 | A1* | 11/2010 | McCarthy | H04L 29/12066 709/226 |
| 2012/0084413 | A1* | 4/2012 | Pasternak | G06F 11/3466 709/224 |
| 2012/0084780 | A1* | 4/2012 | Pasternak | G06F 11/3466 718/100 |
| 2015/0382208 | A1* | 12/2015 | Elliott | H04W 16/18 370/252 |
| 2015/0382212 | A1* | 12/2015 | Elliott | H04W 24/02 370/252 |

\* cited by examiner

*Primary Examiner* — Quang N Nguyen
(74) *Attorney, Agent, or Firm* — Los Angeles Patent Group; Arman Katiraei

(57) ABSTRACT

A test network is provided to test updates to configurations and resources of a distributed platform and to warm servers prior to their deployment in the distributed platform. The test network tests and warms using real-time production traffic of the distributed platform in a manner that does not impact users or performance of the distributed platform. At least one distributed platform caching server passes content requests that it receives to the test network using a connectionless protocol. The test network includes a test server that is loaded with any of a configuration or resource under test or whose cache is to be loaded prior to the server's deployment into the distributed platform. The test network also includes a replay server that receives the requests from the caching server, distributes the requests to the test server, and monitors the test server responses.

18 Claims, 8 Drawing Sheets

```
$ cat /etc/iproute2/rt_tables
# reserved values
255     local
254     main           620
253     default
0       unspec
# local
#1      inr.ruhep      610
200     Shadow
```

```
$ ip rule list
0:      from all lookup local
32765:  from 10.82.177.26 lookup Shadow    610
32766:  from all lookup main
32767:  from all lookup default
```

```
                                    610
$ ip route list table Shadow
0.0.0.0/3 via 10.82.178.14 dev bond1
32.0.0.0/3 via 10.82.178.15 dev bond1
64.0.0.0/3 via 10.82.178.14 dev bond1
96.0.0.0/3 via 10.82.178.15 dev bond1
128.0.0.0/3 via 10.82.178.14 dev bond1
160.0.0.0/3 via 10.82.178.15 dev bond1
192.0.0.0/3 via 10.82.178.14 dev bond1
224.0.0.0/3 via 10.82.178.15 dev bond1
```

FIG. 6

DISTRIBUTED PLATFORM TEST NETWORK

BACKGROUND INFORMATION

Content delivery networks (CDNs) and other distributed platforms are tasked with delivering the content of various content providers in an accelerated manner. To do so, these platforms deploy points-of-presence (PoPs) at various geographic locations. Each PoP includes one or more servers that cache and distribute the content provider content in an optimized manner. The optimized distribution stems in large part from the geographic proximity of the PoP to content consumers. Requests from the content consumers are routed to the PoP that is closest to them in order for the content consumers to receive the requested content over the fewest number of hops. The optimized distribution provided by the distributed platforms can also involve modifying the content itself by compressing, reducing resolution, changing bit rates, etc. so as to reduce the size of the content that needs to be delivered. In some cases, the optimized distribution stems from using higher performing resources of the distributed platform over resources of the content provider in order to deliver the content.

Distributed platforms continually update their resources and configurations to improve upon their content delivery performance. The resources include the deployed hardware such as the caching servers, routers, load balancers, etc. as well as any of the processors, memory, storage, and networking components of the hardware. Resources can be updated by swapping out lower performing hardware with higher performing hardware or adding to existing hardware. Resources can also be updated by scaling the deployed infrastructure. This involves increasing the content delivery footprint of the distributed platform by adding new hardware to supplement the hardware already deployed to the PoPs and by bringing new PoPs online to take over the content delivery duties from more remote or more overloaded PoPs. The configurations control the operation of the resources. Some such controls involve specifying how requests are processed and how requests are routed. The configurations also control how the caching server cache is managed by controlling what, how, and when content is cached and evicted from the cache.

The problem is how to test a resource or configuration prior to introducing the update into the distributed platform production environment, wherein the production environment includes the deployed resources and configurations that are actively responding to content requests and being used to distribute content provider content to different users. Testing any configuration or resource update in the distributed platform production environment is problematic because any error or incompatibility that is introduced by the update may not only degrade performance of the machine running the updated resource or configuration, but may have an undesired trickledown effect that degrades performance of other machines and other resources or configurations that interoperate with the updated configuration or resource. This performance degradation can affect customers that depend on the distributed platform for the distribution of their content and users that obtain the content from the distributed platform.

The alternative is to test the updated configuration or resource without real-time production traffic. However, production traffic is inclusive of most scenarios that the distributed platform is likely to encounter and not using production traffic in testing can lead to inaccurate and incomplete tests, whereby bugs remain hidden until the update is deployed to the production environment and run against the production traffic. One solution is to simply store a copy of the production traffic and replay it later in a test environment. This however introduces its own set of issues as the replayed traffic is no longer real-time and suffers from decay. Accordingly, time-to-live parameters, internal and external network conditions, authentication tokens, etc. may change from when the production traffic was originated to when it was replayed. These changes can again introduce inaccurate results, invalid test results, or, at the very least, performance results that cannot be compared with performance of the production environment.

Moreover, in some cases, the distributed platform cannot cold start a new configuration or resource in the production environment even when that resource is fully tested. In the context of a CDN, a new PoP that receives a cold start is likely to have performance issues. Specifically, the new PoP will not have any content cached when it begins operation. During operation, every request that initially comes in will likely result in a cache miss. The cache miss is an expensive operation that requires the new PoP resources to retrieve the requested content from an origin source, possibly cache the retrieved content locally, and then distribute the content to the requesting content consumer. Several such cache misses can overwhelm the new PoP resources and cause the new PoP to fail.

Accordingly, there is a need to test configurations and resources of a distributed platform with real-time production traffic in a manner that does not impact the performance of the distributed platform. There is also a need to avoid cold starting new configurations or resources in the distributed platform production environment.

BRIEF DESCRIPTION OF THE DRAWINGS

A preferred embodiment for the distributed platform test network will now be described, by way of example only, with reference to the accompanying drawings in which:

FIG. 6 illustrates the configuration of two routing tables on a test server in accordance with some embodiments.

DETAILED DESCRIPTION OF PREFERRED EMBODIMENTS

Some embodiments provide a test network for testing updates to configurations and resources of a distributed platform using real-time production traffic from the distributed platform production environment in a manner that has little to no impact on the performance of the distributed platform, customers of the distributed platform that rely on the distributed for delivery of their content or other services, and users that receive content from the distributed platform. In some embodiments, the test network provides a slow-start to "warm" new resources or new caching servers prior to their deployment within the distributed platform production environment.

Figure 1:
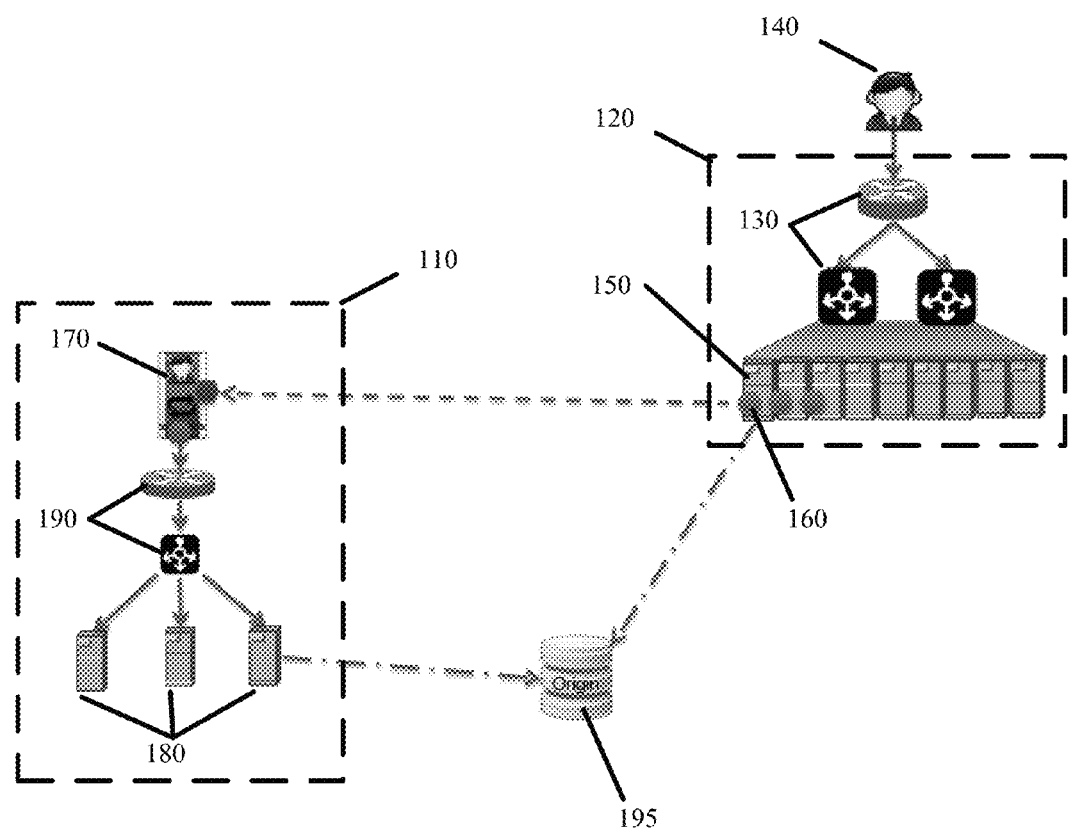
FIG. 1 illustrates operation of the test network in conjunction with the distributed platform production environment.

FIG. 1 illustrates operation of the test network in conjunction with the distributed platform production environment. The figure conceptually illustrates the test network 110 and a Point-of-Presence (PoP) 120 that represents part of the distributed platform production environment. The PoP 120 includes one or more routers and/or load balancers (collectively 130) that route requests, content, and other traffic between users 140 and caching servers 150 operating in the PoP 120.

Some embodiments provide one or more request streamers 160 that are configured on and execute in conjunction with one or more of the caching servers 150. Each request streamer 160 is tasked with capturing and transferring production traffic from a corresponding caching server 150 to the test network 110 in real-time and in a non-impactful manner. Specifically, the request streamer 160 sniffs the network stack of the corresponding distributed platform caching server 150 on which it is configured in order to identify content requests and connection termination packets. Those content requests and connection termination packets are passed to the test network 110 using a connectionless protocol, such as the User Datagram Protocol (UDP). By extracting the content requests and connection termination packets and ignoring all other packets, the amount of real-time production traffic used in testing is greatly reduced in comparison to prior art methodologies that mirror each and every incoming packet and the reduction in traffic is achieved without any loss in accuracy. Specifically, in some embodiments, the request streamer 160 extracts the Uniform Resource Locator (URL), HyperText Transfer Protocol (HTTP) method, and other HTTP header information from HTTP GET and HEAD requests and FIN and RST Transmission Control Protocol (TCP) connection termination packets from the network stack. In so doing, the caching server 150 is freed from maintaining any state information for any of the requests and is similarly freed from maintaining any connection overhead when transferring the real-time production traffic to the test network 110 with a connectionless protocol as opposed to a connection oriented protocol, such as TCP.

By selecting which caching servers 150 the request streamer 160 executes on and mirrors requests from, the distributed platform is able to selectively filter the production traffic that is to be used for testing. For example, a first caching server may respond to requests for streaming content and a second caching server may respond to static content requests. Accordingly, when the configuration or resource under test in the test network is to be tested using streaming content, then production traffic from the first caching server is mirrored to the test network and when testing is to be done using static content, then production traffic from the second caching server is mirrored to the test network. Similarly, if a new PoP is to be deployed adjacent to a particular PoP of the distributed platform, then production traffic from that particular PoP is mirrored to the test network to warm the new PoP as the new PoP will likely respond to some or all of this production traffic once the new PoP deployed into the distributed platform production environment. In any event, using the real-time production traffic for testing provides an expansive set of test parameters that account for a wide range of header parameters, client features including operating systems and different user devices, and customers with different configurations, data sizes, and origins, all of which mirror real world cases encountered by the distributed platform.

The test network 110 comprises one or more replay servers 170, test servers 180, and routers 190. The at least one test server 180 is loaded with any of a configuration or resource that is under test or that is slow-started for subsequent deployment into the distributed platform production environment. The at least one replay server 170 facilitates testing of test server configuration or resource under test using the real-time production traffic.

The replay server 170 receives the real-time production traffic, and more specifically, the sniffed content requests and connection termination packets, from one or more of the distributed platform caching servers 150 configured with a request streamer 160. As noted, the replay server 170 receives the real-time production traffic through a connectionless, non-persistent, and stateless transfer. The replay server 170 performs an address binding operation to preserve the address of the original request sender. The address binding operation allows the replay server 170 to spoof the addressing of the request senders. The replay server 170 does so in order to emulate the request senders and monitor the test servers' 180 responses to the request senders' content requests. In its emulation of the request senders, the replay server 170 may also send acknowledgement packets to acknowledge the test servers' 180 responses. In some embodiments, the address binding operation may be omitted. Next, the replay server 170 supplies the test network test servers 180 with the content requests.

The test servers 180 process and respond to the supplied requests in part using the configurations and resources under test. Each test server 180 is configured with two routing tables. The first routing table provides the test server 180 access to an external network when the test server 180 needs to retrieve content in order to respond to a content request. The first routing table also allows administrative access to the test server 180. The second routing table ensures that any test server 180 responses to content requests are retained within the test network 110 and are passed to the appropriate replay servers that issued the requests, rather than the original request senders being spoofed by the replay servers. Moreover, the second routing table allows the replay server 170 to monitor the test server 180 response and also contain the testing within the test network 110 so as to not disturb operation of the distributed platform production environment or users 140 requesting and receiving content from the distributed platform.

The routers 190 facilitate the containment of the testing within the test network 110. In some embodiments, the routers 190 are configured with different virtual local area networks (VLANs) that route the test server 180 responses to the replay servers 170 and allow test server 180 access to the external network when retrieving requested content from an external origin.

Figure 2:
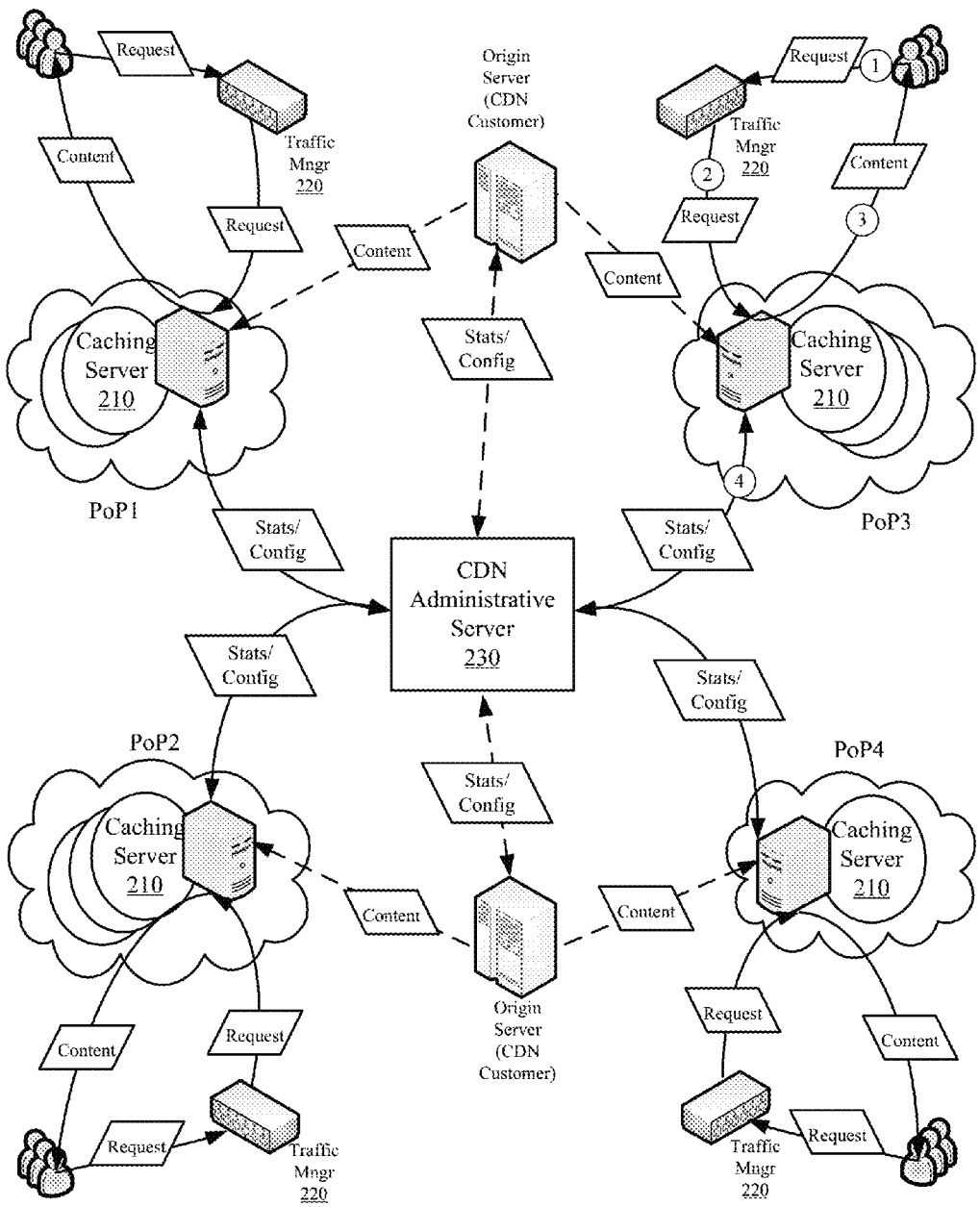
FIG. 2 presents an exemplary distributed platform production environment.

FIG. 2 presents an exemplary distributed platform production environment. Specifically, FIG. 2 illustrates an exemplary content delivery network (CDN) that is used to distribute content to geographically disbursed users in an optimal manner. Though described with reference to a CDN, the depicted architecture is illustrative of any cloud based distributed platform that hosts and distributes content to users.

The architecture includes a distributed set of caching servers 210, traffic management servers 220, and an administrative server 230. The figure also illustrates the interactions that distributed platform customers including content providers have with the distributed platform and interactions that content consumers or users have with the distributed platform.

Each caching server of the set of caching servers 210 may represent a single physical machine or a cluster of machines that serves content on behalf of different content providers to end users. The cluster of machines may include a server farm for a geographically proximate set of physically separate machines or a set of virtual machines that execute over partitioned sets of resources of one or more physically separate machines. Pertinent resources of the caching servers for performing the primary caching and content delivery functions include processors, memory, storage, and network interfaces. Other resources of the caching servers are described with reference to FIG. 8 below. The set of caching servers 210 are distributed across different network edges of the Internet to facilitate the "last mile" delivery of content. Each cluster of servers 210 at a particular network edge may represent a PoP, wherein a user is typically routed to the closest PoP in order to download content from the distributed platform with the goal of minimizing the time needed to deliver the content to the user.

A configuration includes software, code, or other instruction sets that controls the caching server operation and allows the sets of caching servers 210 to operate as a synergistic content distribution system. In some embodiments, the configuration controls operation of the caching server's resources and caching functionality. Any caching server may be configured with one or more configurations. In the context of a CDN, the configuration controls what, how, and when content is cached and evicted from the caching server cache and how the caching server responds to different user content requests. Different caching servers may execute using different configurations. In some cases, different configurations can be used to optimize one set of caching servers for small content distribution and another set of caching servers for large content distribution. The configurations are administered by the distributed platform. In some embodiments, the administrative server 230 manages and deploys the configurations to the different caching servers.

One or more load balancers may be present within each PoP for distributing requests across the set of caching servers 210 of a given PoP. The load balancers may operate using a simplistic round-robin distribution of requests or a more complex hashing based technique that provides a consistent distribution of requests whereby specific requests or requests from specific users are consistently distributed to the same caching server of the PoP.

The traffic management servers 220 route users, and more specifically, user issued requests for content to one or more caching servers that can optimally deliver the requested content back to the caching users. The traffic management servers 220 may be routers or switches. Different distributed platform implementations utilize different traffic management schemes to achieve the desired routing including Anycast routing or Domain Name System (DNS) routing. The traffic management servers 220 also facilitate inter-PoP and intra-PoP communications between the caching servers.

The administrative server 230 may include a central server of the distributed platform or a distributed set of interoperating servers that perform the configuration control and reporting functionality of the distributed platform. Content providers register with the administrative server 230 in order to access the distributed platform services and functionality. Accordingly, content providers are also referred to as customers. Once registered, content providers can interface with the administrative server 230 to designate content to be offloaded to the distributed platform for delivery, configure caching and eviction parameters, and view performance reports as some examples. The administrative server 230 also aggregates statistics data from each server of the set of caching servers 210 and processes the statistics to produce usage and performance reports. From these reports, the content provider can better understand the demand for its content, the provided content delivery performance, and the need for capacity reallocation, among other uses.

Figure 3:
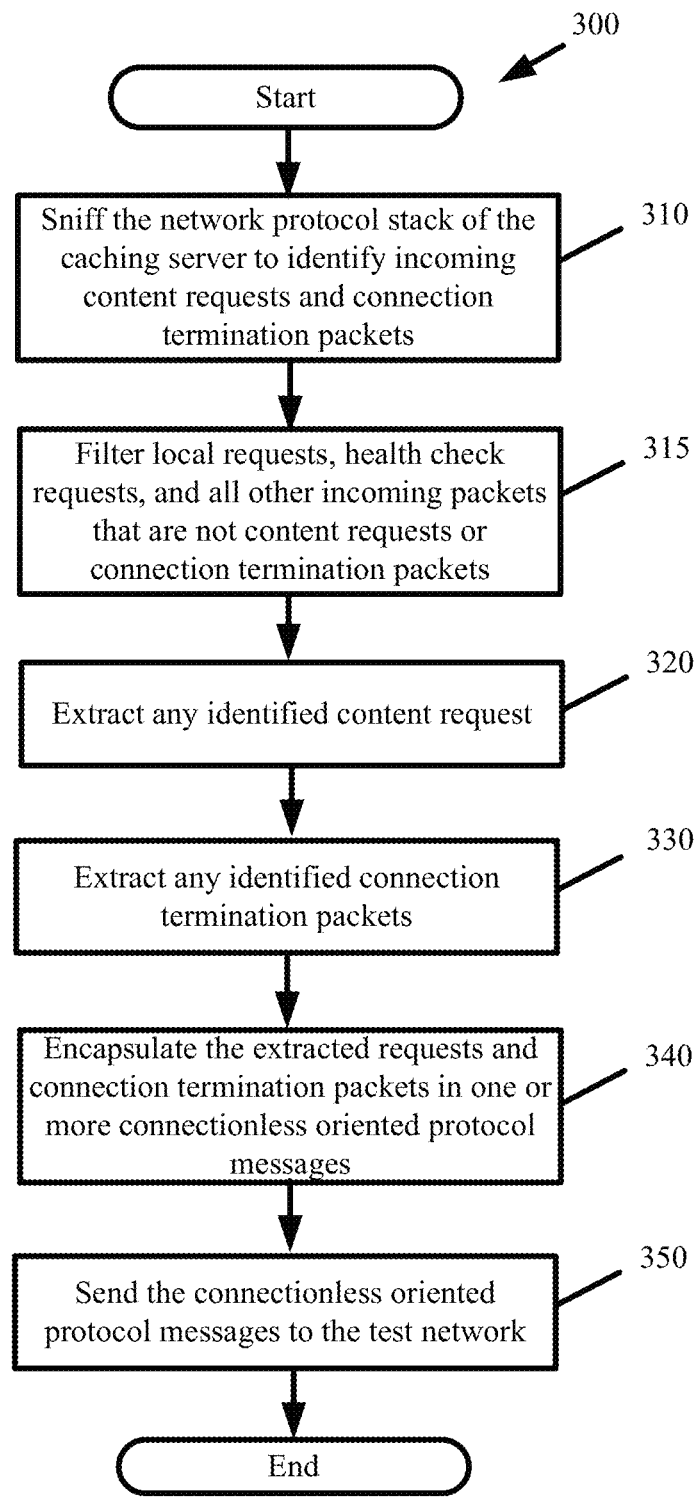
FIG. 3 presents a process by which the request streamer running on a caching server within the distributed platform mirrors real-time production traffic to the test network for testing in accordance with some embodiments.

FIG. 3 presents a process 300 by which the request streamer running on a caching server within the distributed platform mirrors real-time production traffic to the test network for testing in accordance with some embodiments. The request streamer comprises software instructions that modify operation of the caching server in a non-intrusive and non-impactful manner. In other words, the performance of the caching server is only minimally affected by execution of process 300.

The process commences by sniffing (at 310) the network protocol stack of the caching server to identify incoming content requests and connection termination packets. In some embodiments, sniffing incoming content requests involves identifying HTTP GET and HEAD requests within the network protocol stack. As part of identifying content requests, the process filters local requests, health check requests, and all other incoming packets. For instance, connection setup packets and handshaking packets are ignored. In some embodiments, sniffing connection termination packets involves identifying Transmission Control Protocol (TCP) FIN and RST packets.

Any identified content request is extracted (at 320) by the process. In some embodiments, the content request extraction involves extracting the content request header identifying a source address identifying the user submitting the request, a destination address identifying a destination within the distributed platform, a content identifier identifying the content being requested, and optionally other parameters such as the type of device or user agent from which the request was submitted, HTTP method, HTTP version, a directory path, an encoding for the content, an authentication token, geolocation information, etc. The source and destination addresses can be an Internet Protocol (IP) address and a port number. The content identifier is typically a URL. In some embodiments, the content request extraction also involves extracting TCP window sizes or the delay between acknowledgements so that the replay servers can mimic the client connection speed in the test network. In some other embodiments, the content request extraction also involves providing a timestamp to each extracted content request so that the client connection speed can again be mimicked in the test network.

Any identified connection termination packets are also extracted (at 330) by the process. These packets relate to the connections that each user establishes with the caching server prior to requesting content from the server. Multiple requests may be sent by the same user over the same connection. Once the user receives its requested content, the corresponding connection for that user may be closed using one or more connection termination packets. By mirroring the connection termination packets, the test network can effectively replicate the connection setup and tear down associated with each requesting user.

The process encapsulates (at 340) the extracted requests and connection termination packets in one or more connectionless oriented protocol messages. In preferred embodiments, the connectionless oriented protocol messages are UDP messages. In some embodiments, one or more content requests and connection termination packets are encapsulated in the same UDP message. Specifically, the UDP message body can include multiple HTTP request headers for different requests and/or multiple connection termination packets for different user connections. In other embodiments, one content request or one connection termination packet is included in each UDP message.

The process then sends (at 350) the connectionless oriented protocol messages to the test network. The request streamer may be configured to send all messages to one address in the test network. Alternatively, the request streamer may perform a load balancing operation whereby the mirrored traffic is sent to two or more different addresses in the test network. These addresses are the IP addresses and/or port numbers for the different replay servers operating in the test network. Hashing may be used to provide a consistent distribution such that requests for the same content or requests from the same user are sent to the same destination within the test network. Process 300 repeats until the testing period is over or no additional test traffic is needed.

Process 300 allows the caching server to mirror the desired real-time production traffic in an overhead free manner. Process 300 frees the caching server from unnecessarily mirroring each and every packet it receives by extracting and replaying only the content requests and connection termination packets of interest. As a result, the mirroring burden on the caching server is significantly lower than prior art implementations that mirror each and every packet. Moreover, process 300 relies on a connectionless oriented protocol to mirror the desired traffic to the test network. Consequently, the caching server does not need to maintain a connection and the accompanying state information with the test network. For these reasons, the mirroring occurs in a connectionless, non-persistent, and stateless manner. Using UDP or another connectionless protocol allows the request streamer to mirror the production traffic as it is received, thereby facilitating the real-time mirroring of the production traffic. Also, process 300 does not modify the content requests or the connection termination packets prior to mirroring them. Thus, once the desired traffic is mirrored, the caching server is isolated from the actual testing that occurs within the test network.

Figure 4:
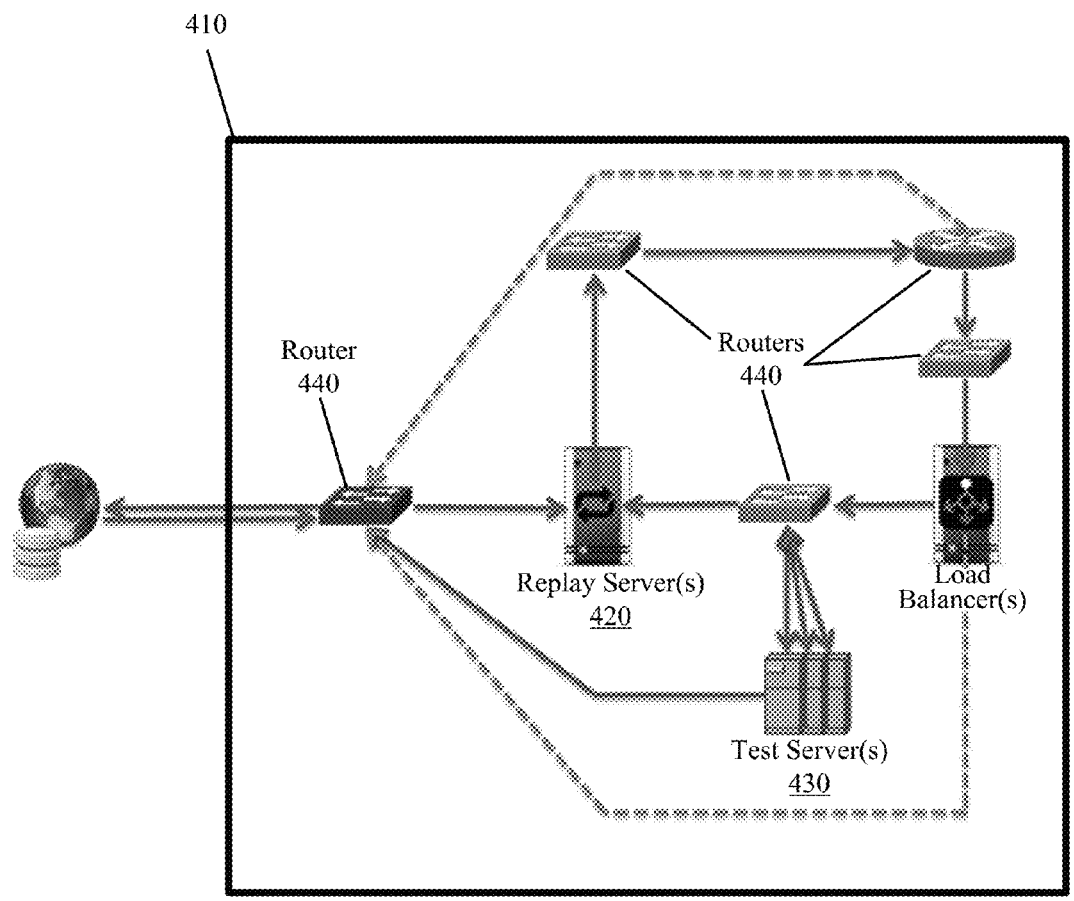
FIG. 4 illustrates various components of the test network in accordance with some embodiments.

Operation of the test network will be described with reference to FIG. 4. FIG. 4 illustrates various components of the test network in accordance with some embodiments. As shown, the test network 410 comprises one or more replay servers 420, test servers 430, and routers 440. Other components of the test network 410, including the load balancers, are omitted to simplify the discussion and retain focus on the primary components of the test network 410.

The test server 430 is loaded with any of a configuration or resource that is under test. This can include loading the test server 430 with a new caching server configuration or an update to a configuration that is deployed in the distributed platform production environment. This can also include loading the test server 430 with one or more resources to replace or supplement resources already deployed within the distributed platform production environment. For example, the test server may be configured and tested with a new solid state drive to determine if performance of the new drive exceeds the performance of drives deployed within the distributed platform production environment. Alternatively, the test server 430 may be a new caching server or a new caching server that is to be included as part of a new PoP that is to be deployed within the distributed platform production environment.

The replay server 420 receives the connectionless oriented protocol messages (e.g., UDP messages) containing the mirrored real-time production traffic flows from any one or more caching servers executing the request streamer process of FIG. 3. In some embodiments, request streamer process is configured with one or more IP or virtual IP (VIP) addresses of the replay server 420 to which the mirrored traffic flows are sent. The replay server 420 extracts the content requests from the received messages and emulates the requesting user behavior by establishing and maintaining connections with the test servers 430, issuing the requests to the test servers 430 over the connections, and monitoring the response of the test servers 430. In some cases, monitoring involves determining if the updated configurations or resources under test are performing error free or if they provide improved performance over configurations or resources that are already deployed throughout the distributed platform production environment. In some embodiments, monitoring also involves the replay server 420 replying to the test server responses including, for example, acknowledging packets that are sent by the test servers 430 in response to the issued content requests.

Testing in this manner allows for comparative testing, whereby the same traffic flows applied to an existing configuration or resource of the distributed platform production environment can also be applied to an updated configuration or resource of the test network in order to determine if the update provides improved performance. Such testing also allows the replay server 420 to "warm up" or slow-start the test server 430 prior to the test server 430 being deployed within the distributed platform production environment.

Figure 5:
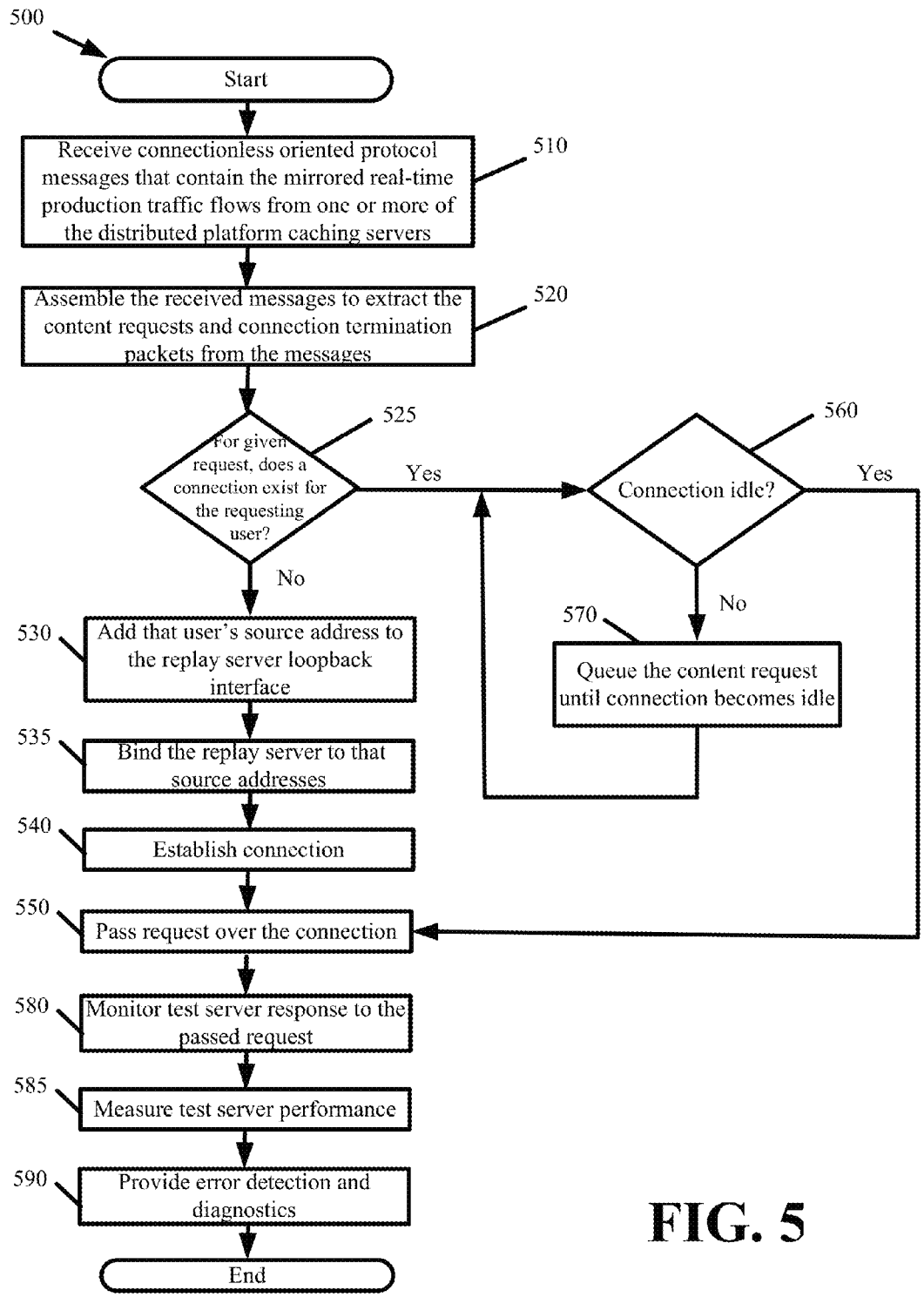
FIG. 5 presents a process performed by a test network replay server to facilitate testing within the test network.

FIG. 5 presents a process 500 performed by a test network replay server to facilitate testing within the test network. The process 500 commences by the replay server receiving (at 510) the UDP or other connectionless oriented protocol messages that contain the mirrored real-time production traffic flows from one or more of the distributed platform caching servers.

The process assembles (at 520) the received messages to extract the content requests and connection termination packets from the messages. This may involve extracting an HTTP GET or HEAD request header from a UDP message and rebuilding the HTTP GET or HEAD request packet using the extracted header. In rebuilding the content requests, the process reuses the original requesting user's source address rather than replace the source address with its own. This ensures that the testing mirrors the actual distributed platform production traffic. The content request destination address may be changed to identify a load balancer or one or more test servers in the test network.

The replay servers then establish or reuse connections in a manner that emulates operation of the production environment prior to distributing the content request. Specifically, each connection is used to emulate operation of a different requesting user with the requesting user submitting one or more requests over the connection. There may be one or more connections established for each emulated user. The connections can be TCP connections established between the replay server and either a test network load balancer or test server. Accordingly, for a user or source address of each content request, the process determines (at 525) if a connection exists for that user or source address.

When a connection has not been established for emulating a requesting user identified through the source address of an extracted content request, the process adds (at 530) that user's source address to the replay server loopback interface and binds (at 535) the replay server to that source address. This configures the replay server to receive test server responses that are directed to the requesting user's address. In so doing, the replay server can monitor the test server responses, measure their performance, and detect any errors. Moreover, the address binding ensures that any tokens or geolocation information that are provided in connection with a user request remain valid. If the request source address was replaced instead of being bound to the replay server, then tokens, geolocation information, and other features can become mismatched and invalid. The mismatching can cause the test servers to respond differently to the user requests than the production environment caching servers and, as a result, produce inaccurate or unexpected test results. A bound user address may be removed upon receiving a connection termination packet for a connection that is associated with that user address. When multiple connections are established for the same user address, the user address may be removed when all the connections associated with that user address are terminated. The process then establishes (at 540) the connection with either the test network load balancer or test server and passes (at 550) the request over the connection. This involves writing the request on the socket on which the connection is established.

When a connection is established, the process determines (at 560) if the connection is idle or busy. When the established connection is idle, the process passes (at 550) the content request over the established connection, ultimately routing to the test server under test for a response. When the established connection is busy, the process queues (at 570) the content request for passing to a test server once the connection becomes idle.

If during execution of process 500, the replay server receives a connection termination packet for a given connection, the replay server will close that connection accordingly. In some embodiments, if a FIN connection termination packet is received when the established connection is busy, that FIN packet is queued to subsequently terminate the connection when it becomes idle, whereas if a RST connection termination packet is received when the established connection is busy, the process immediately closes the connection even if the connection is not idle. Also, the requesting user address associated with that connection will be removed or unbound from the replay server. This is to mirror behavior from the production environment in test network regardless of the reasons for why the connection termination packet was sent. If requests are queued for a connection that has been closed, the replay server may reestablish the connection to continue submitting the requests in the queue or the requests may be dropped and various errors or network states may be logged.

In passing the content requests to the test servers, the replay server may simulate the actual rate at which requesting users issue those content requests to the caching server(s) within the production environment. Specifically, the distributed platform caching servers may be configured to mirror the incoming content requests to a replay server as soon as they receive them. Thus, when the replay server receives the content requests, the replay server records the time interval between each pair of content requests. Then, when the replay server passes the content requests within the test network, it regulates their transmission rate to introduce time delay gaps that mirror the time delay gaps in which the caching servers submit the requests to the replay server. In some embodiments, the delays can be based on the speed in which acknowledgement packets are sent or received by a caching server. In some embodiments, the delay can be mimicked using receive window sizes. In some embodiments, the caching servers may timestamp each content request as it is received. The timestamp is then included with each content request that the caching server forwards to the replay server. The replay server can then simulate the request rate by redistributing the requests to the test server with a proper delay that is computed from the difference between timestamps of two sequential content requests. Some embodiments also throttle the connections based on their actual throughput.

In some embodiments, after passing the requests to the test servers, the process enters an emulation and monitoring mode. Specifically, the process monitors (at 580) the test servers' response to each distributed request, measuring (at 585) the test servers' performance in responding to the distributed requests, and providing (at 590) error detection and diagnostics. In having the replay server receive and monitor the test server response, the replay server prevents the test servers' response from exiting the test network. In some embodiments, monitoring the response of a test server involves acknowledging that test server's response to ensure complete delivery of the requested content from that test server. By measuring the test servers' performance, the replay server can validate if a test server with an updated configuration or resource is operating as expected. Alternatively, the measured performance can be compared to performance of a caching server using an existing configuration or resource to determine if the updated configuration or resource of the test server performs better.

Each test network test server is configured with two routing tables and the test network routers 440 are configured with two or more VLANs to ensure that the test traffic stays within the test network 410 while still allowing the test servers 430 access to an external network when needed to retrieve content in order to satisfy a request. A first test server routing table specifies a set of static routes for passing response packets that are directed to a requesting user IP address back to the test network replay servers. Specifically, the first test server routing table maps requesting user addresses to the address of the replay server that passes the request. These addresses are those that the replay servers bind to their loopback interface. Packets addressed to a requesting user IP may also be tagged with a first VLAN ID to cause the test network routers 440 to route such packets back to the replay servers rather than to a gateway router or other core router from which the packets could exist the test network 410. A second test server routing table allows other addresses to be routed to an external network in order to receive content from different origins. These packets may be tagged with a second VLAN ID that causes the test network routers 440 to route such packets outside the test network 410. This second VLAN ID is used when the test servers need to retrieve content from an origin that is outside the test network 410. FIG. 6 illustrates the configuration of two routing tables on a test server in accordance with some embodiments. As shown, the figure demonstrates configuring a "shadow" routing table 610 in addition to a default routing table 620. The shadow routing table 610 maps requesting user addresses back to the replay server addresses.

As noted above, the test network and process 500 can be used to slow start or warm a new PoP prior to its deployment within the distributed platform production environment. In this scenario, the mirrored content requests are used to populate the test server caches with content that is temporally relevant to users of the distributed platform.

Figure 7:
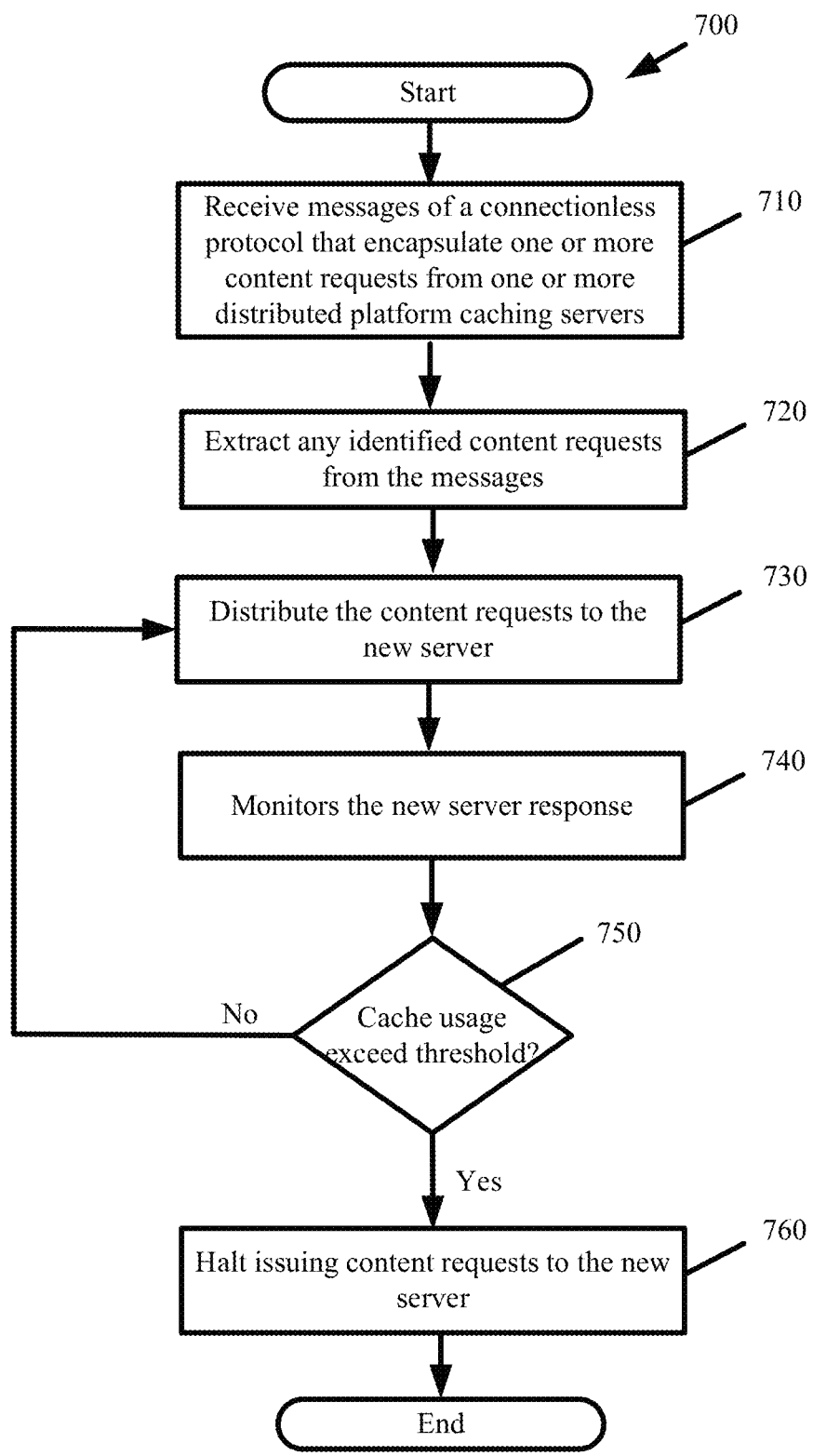
FIG. 7 presents a process for populating cache of a new server using the test network prior to deploying that new server into the distributed platform production environment.

FIG. 7 presents a process 700 for populating cache of a new server using the test network prior to deploying that new server into the distributed platform production environment. In some embodiments, prior to executing process 700, a selection is made to select the relevant traffic flows with which to populate the new server cache. The selection can be based on where the new server is to be deployed or which PoP or servers the new server is to supplement or replace. For example, when the new server is to be used to supplement an existing PoP, then the most relevant content to populate the new server cache will be to use content requests that users submit to that existing PoP as the new server will likely take over and respond to some such content requests once deployed. Similarly, if the test network warms a new PoP, the most relevant traffic flows will likely be those of a PoP that is already deployed to an adjacent region to where the new PoP is to be deployed. Process 700 is then configured to execute using the selected traffic flows.

The process 700 commences by receiving (at 710) messages of a connectionless protocol that encapsulate one or more content requests from one or more distributed platform caching servers. As before, the content requests are extracted (at 720) from the messages and distributed (at 730) by a replay server to the new server. Since the cache miss rate for the new server will be high, the replay server can throttle the rate at which it distributes the content requests to the new server.

The replay server monitors (at 740) the new server response. Part of the monitoring involves determining (at 750) cache usage of the new server. So long as the cache usage does not exceed some predetermined threshold, the process continues to issue content requests to the new server. However, once the cache usage reaches the predetermined threshold, the replay halts (at 760) issuing the requests to the new server and the new server is ready for deployment into the distributed platform production environment where it can begin to receive and respond directly to user requests for content.

The real-time relevance of the content requests is especially important in the scenario above. By mirroring the content requests from the production environment as they are received, the test network ensures that the new server cache is populated with the same content as in the production environment cache and not obsolete or outdated content that has been evicted from the production environment cache.

Thus far, the replay server has been described as a machine that operates independent of the production environment servers (e.g., caching servers). However, in some embodiments, the replay server functionality can be implemented as part of caching server functionality of functionality of another server within the distributed platform production environment. When the replay server is run on the same machine, developers are able to test new configurations and resource locally on that machine. In some embodiments, the replay server is implemented in a third party platform. For example, a first CDN can provide its production traffic to a replay server running in a second CDN in order to test performance of the second CDN with first CDN request patterns and loads. In such scenarios, the address binding is typically omitted and the source address of the requests being replayed is replaced with the address of the replay server.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 8:
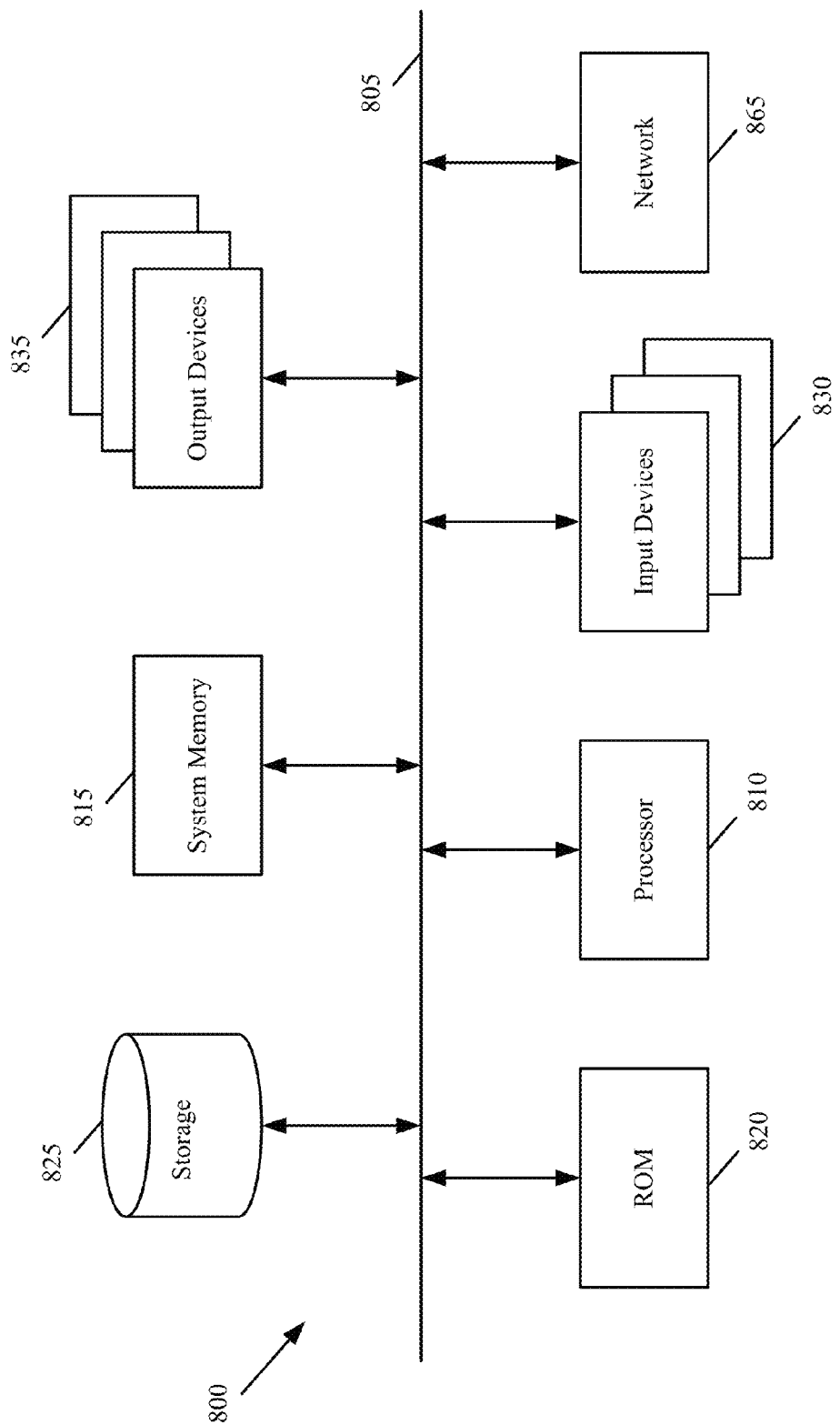
FIG. 8 illustrates a computer system or server with which some embodiments are implemented.

FIG. 8 illustrates a computer system or server with which some embodiments are implemented. Such a computer system includes various types of computer-readable mediums and interfaces for various other types of computer-readable mediums that implement the various methods and machines described above (e.g., caching servers, replay servers, test servers, etc.). Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the embodiments described above. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments use a mass-storage device (such as a magnetic, solid-state disk, or optical disk and its corresponding disk drive) as the permanent storage device 825.

Other embodiments use a removable storage device (such as a flash drive or solid-state disk) as the permanent storage device. Like the permanent storage device 825, the system memory 815 is a read-and-write memory device. However, unlike storage device 825, the system memory is a volatile read-and-write memory, such as random access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keypads (including physical keyboards and touchscreen keyboards), pointing devices (also called "cursor control devices"). The input devices 830 also include audio input devices (e.g., microphones, MIDI musical instruments, etc.). The output devices 835 display images generated by the computer system. The output devices include printers and display devices, such as liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 800 may include one or more of a variety of different computer-readable media. Some examples of such computer-readable media include RAM, ROM, compact discs (CD-ROM), digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, and any other optical or magnetic media.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A system comprising:
a plurality of points-of-presence (PoPs) and a test network;
at least one PoP of the plurality of PoPs comprising a plurality of caching servers operating to respond to content requests from a plurality of users by caching and serving requested content to the plurality of users and with a particular caching server of the plurality of caching servers passing content requests that the particular caching server receives to the test network using a connectionless protocol; and
the test network comprising a replay server and a test server, wherein the test server is configured with any one of a configuration and resource under test, and wherein the replay server tests performance of any of the configuration and resource by receiving the content requests from the particular caching server, distributing a particular content request from said content requests to the test server, and monitoring the test server response to the particular content request;
wherein the test server is configured with a routing table mapping an address of a user originating the particular content request to the replay server;
wherein the test network further comprises a plurality of test servers, and wherein the replay server further tests performance of the test server by hashing the particular content request with a result of said hashing selecting the test server from the plurality of test servers for receiving the particular content request.

2. The system of claim 1, wherein the replay server further tests performance of the test server by acknowledging the test server response to the particular incoming request.

3. The system of claim 1, wherein the replay server further tests performance of the test server by establishing a connection with the test server prior to said distributing.

4. The system of claim 1, wherein the replay server further tests performance of the test server by establishing a plurality of connections with the test server, wherein each connection of the plurality of connections is used to simulate request behavior of a different user of the plurality of users that submits a content request to the particular caching server.

5. The system of claim 1, wherein the replay server further tests performance of the test server by detecting errors in the test server response.

6. The system of claim 1, wherein the test network is configured with a first virtual local area network (VLAN) and a second VLAN, the first VLAN routing the test server response to the particular content request to the replay server and the second VLAN provides the test server access to an external network when retrieving content from an address that is different than any address of the plurality of users.

7. The system of claim 1, wherein the particular caching server passes the content requests to the test network using User Datagram Protocol (UDP) messages.

8. The system of claim 1, wherein the particular caching server filters any user packets that are not a content request or a connection termination packet from said passing of the content requests.

9. A computer-implemented method for testing any of a configuration and resource in a distributed platform test network using real-time production traffic of the distributed platform, the computer-implemented method comprising:
receiving from the distributed platform at a replay server in the test network, a message of a connectionless protocol encapsulating a content request identifying a first address of a user that submits said request to the distributed platform;
configuring a route mapping the first address of the user to a second address of the replay server;
extracting the content request from the message of the connectionless protocol;
issuing said content request identifying the first address for the user as the source address from the replay server to a test server of the test network, wherein the test server is configured with at least one of a configuration and resource under test;
receiving based on said issuing, a content request response from the test server at the replay server, wherein the response is directed to the first address of the user; and
monitoring performance of the test server at the replay server based on said response;
wherein the test network comprises a plurality of test servers, and wherein the replay server further tests performance of the test server by hashing the content request with a result of said hashing selecting the test server from the plurality of test servers for receiving the content request.

10. The computer-implemented method of claim 9 further comprising routing the response within the test network and preventing the response from passing to the user.

11. The computer-implemented method of claim 10 further comprising tagging the response from the test server with a first virtual local area network (VLAN) identifier, said routing routes the response within the test network based on the first VLAN identifier.

12. The computer-implemented method of claim 11 further comprising retrieving content for said response from a network external to said test network by issuing from the test server, a second request.

13. The computer-implemented method of claim 12 further comprising tagging the second request with a second VLAN identifier and routing the second request to the external network based on the second VLAN identifier.

14. The computer-implemented method of claim 9 further comprising adding the first address of the user to a loopback interface of the replay server.

15. The computer-implemented method of claim 9 further comprising binding the first address of the user to the replay server.

16. The computer-implemented method of claim 9 further comprising establishing a connection between the replay server and the test server prior to said issuing of the content request.

17. The computer-implemented method of claim 9 wherein receiving the message from the distributed platform using a connectionless oriented protocol comprises receiving a User Data Protocol (UDP) message encapsulating the content request.

18. A computer-implemented method for warming a new server prior to deployment of the new sever within a production environment of a distributed platform, the computer-implemented method comprising:

selecting a particular server from a plurality of distributed servers operating within the production environment of the distributed platform;

mirroring content requests from the particular server by encapsulating said content requests as messages of a connectionless protocol and passing said messages from the particular server using the connectionless protocol to a test network in which the new server is configured; and populating the new server cache until a specified amount of the cache is filled by (i) passing the content requests to the new server, (ii) copying content that is requested in said content requests from any origin outside the test network to the new server cache, and (iii) routing the new server response to the content requests within the test network.

\* \* \* \* \*